United States Patent Office.

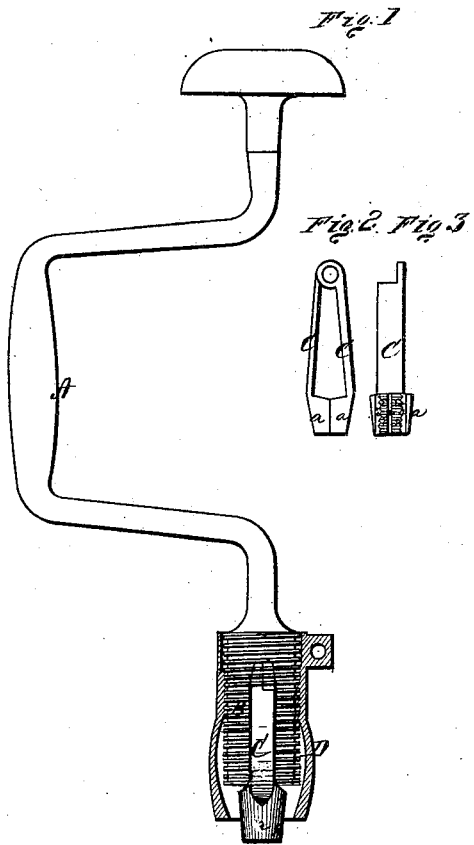

ZINA S. OGDEN, OF GLEN'S FALLS, NEW YORK.

Letters Patent No. 108,933, dated November 1, 1870.

IMPROVEMENT IN DEVICES FOR CUTTING SCREW-THREADS.

The Schedule referred to in these Letters Patent and making part of the same.

*To all whom it may concern:*

Be it known that I, ZINA S. OGDEN, of Glen's Falls, in the county of Warren and in the State of New York, have invented certain new and useful Improvements in Die for Cutting Screw; and do hereby declare that the following is a full, clear, and exact description thereof, reference being had to the accompanying drawing and to the letters of reference marked thereon, making a part of this specification.

The nature of my invention consists in the construction and arrangement of jaws or dies for cutting screws, with the mechanism for operating the same, as will be hereinafter fully set forth.

In order to enable others skilled in the art to which my invention appertains to make and use the same, I will now proceed to describe its construction and operation, referring to the annexed drawing, in which—

Figure 1 is a side view, part in section, of my entire machine, and

Figures 2 and 3 are views of the jaws or dies.

A represents the stock of my machine, constructed in the same manner as the usual auger-stock.

At the end of this stock is formed a thick screw, B, which is slotted from the end inward for a suitable distance.

In this slot are inserted the two jaws, C C, which are hinged or pivoted together at their inner ends.

The outer ends of these jaws are provided with half-cylindrical lips $a$ $a$, having on their inner surfaces teeth $e$ $e$ and longitudinal grooves $i$ $i$, as shown in fig. 3. The jaws thus constructed, being inserted in the slotted screw B, a screw-sleeve, D, is screwed on said screw B. The outer end of the sleeve D being tapering, as shown in fig. 1, it is, of course, evident that, by adjusting said sleeve, the distance the jaws C C are allowed to separate can be readily regulated, and hence any-sized screw may be cut with them.

Having thus fully described my invention,

What I claim as new, and desire to secure by Letters Patent, is—

The jaws C C, hinged together and provided with lips $a$ $a$, having teeth $e$ $e$ and grooves $i$ $i$, in combination with the stock A, slotted screw B, and tapering screw-sleeve D, all substantially as and for the purposes herein set forth.

In testimony that I claim the foregoing, I have hereunto set my hand this 7th day of July, 1870.

ZINA S. OGDEN.

Witnesses:
 ENOCH H. ROSEKRANS,
 C. MORGAN.